UNITED STATES PATENT OFFICE.

ALEXANDER McKECHNIE, OF BIRMINGHAM, AND FREDRIC GEORGE BEASLEY, OF SMETHWICK, BIRMINGHAM, ENGLAND.

PROCESS OF OXIDIZING FERROUS TO FERRIC SOLUTIONS.

1,047,826.     Specification of Letters Patent.     Patented Dec. 17, 1912.

No Drawing.     Application filed April 15, 1912. Serial No. 690,996.

*To all whom it may concern:*

Be it known that we, ALEXANDER MC-KECHNIE, residing at Rotton Park street, Birmingham, England, copper-smelter, and FREDRIC GEORGE BEASLEY, residing at 44 Green street, Smethwick, Birmingham, England, chemical engineer, both subjects of the King of Great Britain, have invented certain new and useful Improvements Relating to Processes of Oxidizing Ferrous to Ferric Solutions, of which the following is a specification.

This invention has reference to the manufacture or production of solutions of ferric sulfate or ferric chlorid, and has for its object, to provide a commercial method or process for rapidly producing these ferric solutions by the direct oxidation of ferrous liquors, such as are at present obtained in metallurgical and other operations as relatively valueless by-product.

The oxidation of ferrous solutions by means of atmospheric oxygen, or by treatment with air in open tanks under normal or low temperatures and atmospheric pressure, proceeds so slowly that the process is practically useless for commercial purposes, and while it has been proposed to accelerate the aerial oxidation of ferrous solutions by treating the same with calcium hydrate in high open vessels and blowing air through the mass in the same way as is done with manganous solutions in the Weldon process, this method of treatment has the disadvantage that it introduces calcium salts into the solutions, which impurity can only be removed with difficulty and at considerable expense. But according to the present invention, ferrous solutions in considerable volume or bulk can be rapidly and completely converted into ferric solutions without the aid of extraneous reagents and without the addition of foreign substances or impurities: this result being attained by a method of direct oxidation, according to which the said ferrous solutions when contained in a pressure vessel or other closed vessel, are subjected to the action of air which is blown into the said vessel under a pressure exceeding atmospheric pressure while simultaneously the solutions are also heated above their boiling point: and our experiments have shown that when ferrous sulfate or chlorid solutions in bulk are subjected to the action of air and heated to a temperature exceeding 100° C. under a pressure of 10 atmospheres or upward, the same are directly oxidized into ferric sulfate or chlorid according to the reaction (in the case of sulfate salt)

and that such oxidation is so accelerated or proceeds so rapidly to completion, that large volumes of solvent-acting ferric solutions can be cheaply produced under commercial conditions.

What we claim is:—

A process for the manufacture of ferric solutions by the direct oxidation of ferrous solutions, consisting in treating such ferrous solutions, in a closed vessel, with air which is blown or forced into the said vessel to maintain therein a pressure exceeding atmospheric pressure while the solutions are also heated above their boiling point, substantially as described.

In testimony whereof we have hereunto set our hands in presence of two subscribing witnesses.

ALEXANDER McKECHNIE.
FREDRIC GEORGE BEASLEY.

Witnesses:
ARTHUR SADLER,
E. J. REEVE.